United States Patent [19]

Mastriani et al.

[11] Patent Number: 4,696,053
[45] Date of Patent: Sep. 22, 1987

[54] ANTENNA ALIGNMENT SYSTEM AND METHOD

[75] Inventors: Dennis Mastriani, Lakewood; Donald Jacoby, Elberon; Jeanne Weise, Ocean; Bruce Linick, Wayside; John Marinho, Elizabeth; Charles M. DeSantis, Neptune, all of N.J.

[73] Assignee: Canadian Marconi Corporation, Montreal, Canada

[21] Appl. No.: 751,386

[22] Filed: Jul. 3, 1985

[51] Int. Cl.$^4$ .............................................. H04B 7/14
[52] U.S. Cl. ....................................... 455/67; 455/25; 455/69; 342/74; 342/359; 342/360; 342/374; 342/426
[58] Field of Search ............................ 455/67, 69, 25; 342/359, 360, 368, 373, 426, 73, 74, 422

[56] References Cited

U.S. PATENT DOCUMENTS

| | | | |
|---|---|---|---|
| 2,538,063 | 1/1951 | Touvet | 342/359 |
| 2,642,567 | 6/1953 | Kimball et al. | 342/359 |
| 2,677,822 | 5/1954 | Perilhov | 342/426 |
| 2,871,344 | 1/1959 | Busignies | 342/359 |
| 3,312,973 | 4/1967 | Rogers | 342/426 |
| 3,560,977 | 2/1971 | Cayzac | 455/69 |
| 4,247,857 | 1/1981 | Wilcke et al. | 342/426 |
| 4,358,767 | 11/1982 | Boieau | 342/426 |

Primary Examiner—Robert L. Griffin
Assistant Examiner—Elissa Seidenglanz
Attorney, Agent, or Firm—Robin Blecker & Daley

[57] ABSTRACT

A method for effecting communication between first and second antennas, includes the steps of (a) mutually displacing the antennas and determining received signal strength at each antenna and positioning said antennas accordingly to obtain a first quality level of communication therebetween; and (b) effecting a second quality level of communication as between the antennas, exceeding the first quality level, by defining a plurality of succeedingly diminishing search movement patterns for each of the first and second antennas, transmitting from the first antenna while displacing the second antenna in one such pattern and detecting the level of receipt of such transmitted energy. The second antenna is now placed in its location of maximum received signal level and transmits while the first antenna is displaced in one of the patterns and its level of receipt of transmitted energy is monitored. The first antenna is now placed in its location of maximum received signal level. This practice of transmitting from one antenna and moving the other in succeedingly diminished patterns and replacement in accordance with received signal strength continues until the desired second quality level of communication is attained. Maintenance of the second quality level of communication is practiced by quite small antenna search patterns on given lessening of communication quality.

The antennas are supported on masts and preferred practice includes the further step of sensing movement of the masts and displacing the antennas responsively to such sensed mast movement in excess of a given threshold level. A system is disclosed for implementation of the practice.

21 Claims, 12 Drawing Figures

FIG. 3

| 77 | 76 | 75 | 74 | 73 | 72 | 71 | 70 | 69 | 68 |
|----|----|----|----|----|----|----|----|----|----|
| 78 | 107 | 108 | 137 | 138 | 7 | 8 | 37 | 38 | 67 |
| 79 | 106 | 109 | 136 | 139 | 6 | 9 | 36 | 39 | 66 |
| 80 | 105 | 110 | 135 | 140 | 5 | 10 | 35 | 40 | 65 |
| 81 | 104 | 111 | 134 | 141 | 4 | 11 | 34 | 41 | 64 |
| 82 | 103 | 112 | 133 | 142 | 3 | 12 | 33 | 42 | 63 |
| 83 | 102 | 113 | 132 | 143 | 2 | 13 | 32 | 43 | 62 |
| 84 | 101 | 114 | 131 | 144 | 1 | 14 | 31 | 44 | 61 |
| 85 | 100 | 115 | 130 | 145 | 160 | 15 | 30 | 45 | 60 |
| 86 | 99 | 116 | 129 | 146 | 159 | 16 | 29 | 46 | 59 |
| 87 | 98 | 117 | 128 | 147 | 158 | 17 | 28 | 47 | 58 |
| 88 | 97 | 118 | 127 | 148 | 157 | 18 | 27 | 48 | 57 |
| 89 | 96 | 119 | 126 | 149 | 156 | 19 | 26 | 49 | 56 |
| 90 | 95 | 120 | 125 | 150 | 155 | 20 | 25 | 50 | 55 |
| 91 | 94 | 121 | 124 | 151 | 154 | 21 | 24 | 51 | 54 |
| 92 | 93 | 122 | 123 | 152 | 153 | 22 | 23 | 52 | 53 |

$P = 10$, $n = 16$, 258

ANTENNA ALIGNMENT SYSTEM AND METHOD

FIELD OF THE INVENTION

This invention relates generally to radio communication and pertains more particularly to method and system for antenna alignment in microwave radio communication and maintenance of same.

BACKGROUND OF THE INVENTION

Communication antenna setup and alignment, especially in military tactical situations, desirably is to be effected with a view toward the minimization of consumed time from the point of on-site arrival of equipment to operational status. Typically, the military equipment is inclusive, in present commercially available and approved embodiments, of an hydraulic mast supporting an antenna platform. Mast erection, cable connection and power up customarily consume about an hour. Alignment of two communicating antennas, following initial coarse positional coordinate input, is then effected by trial and error antenna movements and operator voice communication over auxiliary communication lines. Generally, this latter phase extends the total time to some five hours before the communication link is fully operational at desired quality level.

Once set up, the link is susceptible to communication quality diminution, as by wind effects upon the separate participating antennas. This aspect becomes less adverse to performance where extended mechanical design steps are taken to minimize mast wind-induced deflection. Higher equipment costs of course attend such design steps.

Prospective equipment specifications, presently under consideration for military endeavors, look advantageously to lighter-weight and taller masts, the erection of which would significantly lessen manpower requirements and provide overview of tall trees and like interfering obstructions to line-of-sight communication, with attendent lessened equipment manufacturing costs and transportation costs. On the negative side, however, alignment and maintenance of same presently derives in part from enhanced mast immobility, and the prospective equipment is not accommodated by present system and method.

Prior art efforts, as set forth in various U.S. patents to be made of record herein, look toward enhancement of antenna alignment and communication quality through the use of ancillary support and control systems. Such prior art efforts involve the supporting of an antenna for movement independently in azimuth and elevation and the transmission of an energy pattern having transmitted signal characteristics adaptive to reaching an aligned condition as between participating antennas and assistive of maintaining alignment thereof. In one known system, transmitted signal characteristics are of diverse frequency pattern, involving permutations of as many as seven discrete frequencies. Receivers sensitive to each transmitted frequency are employed, presenting a relatively complex system for solution to the alignment problem.

In applicants' view, the above-noted systems presently commercially available, particularly to the military establishment, are unduly consuming both of time and manpower, involve mechanical overdesign, and to not effectively maintain alignment, once achieved. The referenced patented prior art efforts are seen as unduly complex and not sufficient to provide effective antenna alignment and maintenance of same.

SUMMARY OF THE INVENTION

The present invention has as its primary object the provision of improved method and system for the alignment and maintenance of alignment of antennas in communication systems.

A more specific object of the invention is to diminish set-up time for military line-of-sight radio communication systems in tactical deployment.

In attaining the foregoing and other objects, the invention provides system and method for antenna positioning including azimuthal and elevational antenna displacement means associated with each participating antenna. Control means are provided and are operative in an "acquisition" phase for mutual but independent displacement of the antennas at respective different rates, during a common time period where the equipment is of full duplex type, to achieve a first quality level of communication therebetween. In the case of half duplex equipment, practice is during separate time periods which are successively transmit and then receive for one antenna, and vice versa for the other antenna. Following acquisition, in an "alignment" phase, the control means provides for movement of each antenna in successively diminishing search patterns to achieve a second higher quality level of communication. In a link "maintenance" phase, the control means looks to predetermined levels of communication quality loss and is responsive thereto to direct antenna movement in quite limited search patterns to re-achieve the second quality level of communication. The control means looks further to a mast motion sensing subsystem for input to assist in maintaining the second quality level of communication.

In its particularly preferred method for effecting communication between first and second antennas in the acquisition phase, practice of the invention includes, for full duplex equipment, scanning movement of each of the antennas at respective different rates with transceivers concurrently transmitting and receiving. The received signal strength at each end of the link is determined and the antennas are individually positioned at locations of maximum received signal strength.

In the alignment phase, the first antenna transmits and is maintained stationary while the second antenna receives and is displaced in a given movement pattern. Movement of the second antenna is then discontinued and it is moved to the location of its maximum signal strength receipt during first antenna transmission. The practice now reverses, with the second antenna being stationary and transmitting and with the first antenna moving in such pattern and receiving and being then positioned on the merits of received signal strength. Practice continues with another transmission from the first antenna, while stationary, during movement of the second antenna in a pattern diminished from its earlier movement pattern and signal strength receipt study. The method is continued until a preselected transmission level quality is attained.

In a maintainence phase, the transmission quality is monitored to determine if quality is lessened from the preselected level, whereupon small search patterns are conducted by the antennas to reinstate trnsmission quality at such preselected quality.

The foregoing and other objects and features of the invention will be further understood from the following detailed description of preferred embodiments and practices thereof and from the drawings wherein like reference numerals identify like components and steps throughout.

DESCRIPTION OF THE DRAWINGS

FIG. 3 illustrates a row-column matrix of searching cells usable in practicing the invention.

DESCRIPTION OF PREFERRED EMBODIMENTS AND PRACTICES

Figure 1:
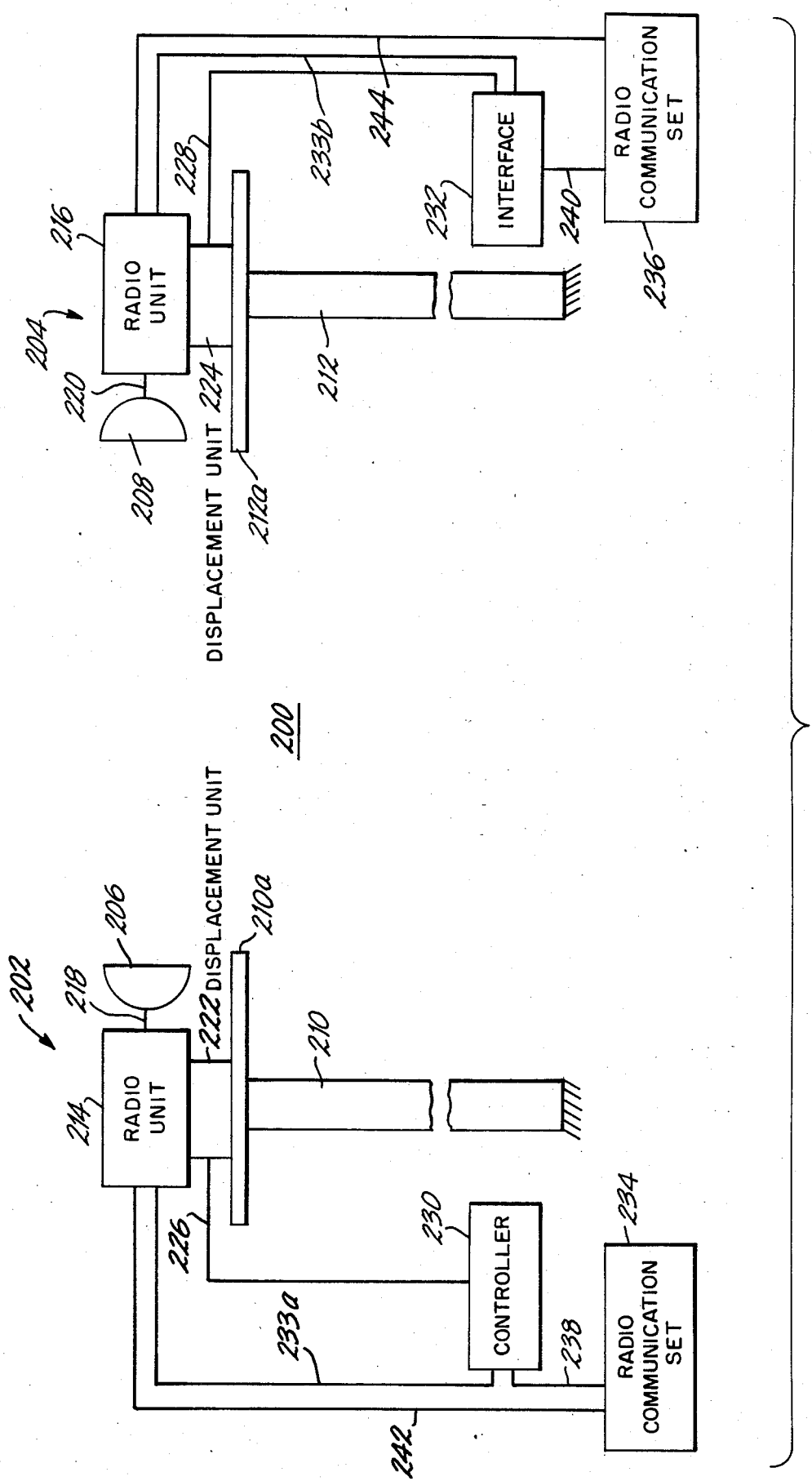
FIG. 1 is a schematic diagram generally illustrative of antenna masts equipped in accordance with the invention and of the system of the invention.

Referring to FIG. 1, radio communication system 200 includes a first station 202 and a second station 204 having respective microwave dish antennas 206 and 208, supported on platforms 210a and 212a of masts 210 and 212, which may be of the taller, lighter-weight prospective type above noted. Radio electronics units 214 and 216 communicate with antennas 206 and 208 over lines 218 and 220. Stations 202 and 204 further include displacement units 222 and 224, which serve to displace antennas 206 and 208 independently in azimuth and elevation, responsively to signals furnished thereto over lines 226 and 228 from controller 230 and interface 232, which communicate over lines 233a and 233b through electronics units 214 and 216. Controller 230 may be a microprocessor, programmed to implement the functions and steps of the flow charts below discussed and achieve the results indicated therein.

Operator radio communication sets 234 and 236 are connected to controller 230 and interface 232 over lines 238 and 240 to interrupt same for manual control and further are connected to radio electronics units 214 and 216 by lines 242 and 244 for orderwire communication.

In broad aspect, the invention looks to the typical military situation and involves either the initial setup of both of stations 202 and 204 or the replacement of one or both of previously established, but destroyed, stations. The following description will be understood to be applicable to either situation and also to non-military uses.

Figure 2:
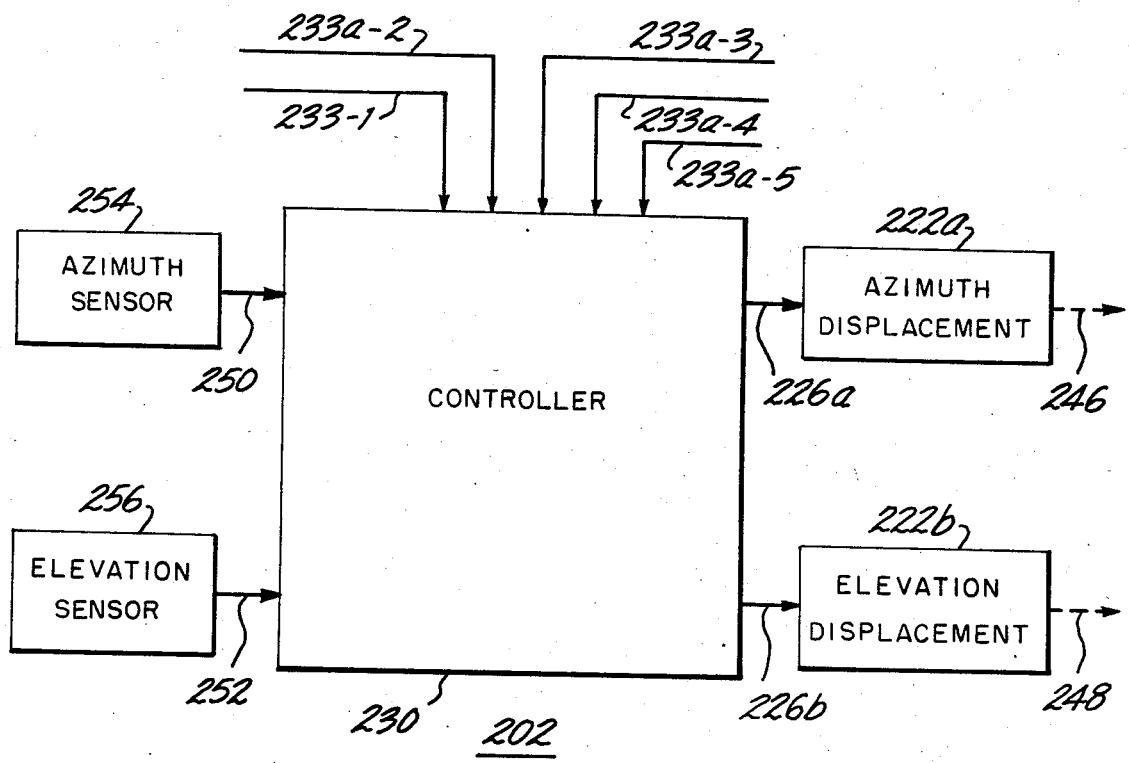
FIG. 2 is a more detailed block diagram of the system of the invention.

The more detailed block diagram of FIG. 2, shown for station 202, illustrates the subsystem at the antenna station, including as outputs of controller 230 respective azimuth and elevation antenna drive signals on lines 226a and 226b, coupled to azimuthal displacement means 222a and elevational displacement means 222b, mechanical outputs thereof being shown at 246 and 248.

Input signals to controller 230 are of several types. Signals indicative of levels of transmitted signals received by station 202 are provided by line 233a-1. Signals indicative of levels of transmitted signals received by station 204 are provided on line 233a-2. Signals indicative of the status, i. e., operational activity, of station 204 are provided by line 233a-3. Commands of controller 230 to stations 204 are appled to line 233a-4. All such line 233a signals are communicated via radio electronics units 214 and 216, antennas 206 and 208, line 233b and interface 232. Interface 232 communicates in turn, as above noted, with displacement unit 224 over lines 228.

Further signals to controller 230 include input from the mast motion sensing subsystem of station 204 on line 233a-5 and input on lines 250 and 252 from the mast motion subsystem of station 202, comprising mast azimuth motion sensor 254 and mast elevation motion sensor 256.

Turning now to FIG. 3, entire cell matrix 258 of each participating station defines an antenna search pattern inclusive of columns and rows, the columns being successive in azimuth and in number n equal to sixteen, for example, and the rows being successive in elevation and in number p equal to ten, for example. In typical instance, the cells are individually of four-tenths of a degree square, whereby the total azimuthal search area is six and fourth-tenths degrees and the elevational search area is four degrees.

Individual cells of matrix 258 are numbered 1 through 160 and the succession of cell makes an increasing spiral-like excursion from the center outwardly and followed by a decreasing spiral-like excursion inwardly to the center. Thus, the searching sequence would be from cell 1 to cell 7 at constant azimuth, then an elevational down step to cell 8, then a reverse constant azimuth course from cell 8 to cell 22, then an elevational down step to cell 23 and a forward constant azimuth course to cell 37, etc., until cell 160 is reached.

By way of introduction to preferred practice of the invention, it will be helpful now to consider search patterns other than the entire cell matrix search pattern of FIG. 3. One such other pattern will be termed a "first partial cell matrix" search pattern and may comprise any succession of n/2 columns and q rows, where q is less than p. In the specific example of matrix 258, n/2 is equal to eight and p is chosen to be eight. Another such other pattern will be termed a "second partial cell matrix" search pattern and may comprise any succession of n/4 columns and q/2 rows. In the example, this pattern is four columns and four rows. A third such other pattern is termed a "third partial cell matrix" search pattern and may comprise any succession of n/8 columns and q/4 rows, and in the example defines any succession of two columns and two rows. As is seen, the described search patterns are of succeedingly decreasing scope. Other search patterns may, of course, be employed, e. g. sawtooth patterns having joint components in horizontal and vertical directions, as may be desired, as alternates to the illustrative pattern under discussion. For convenience, the following discussion will use the illustrative pattern and will further assume that the equipment is of full duplex variety, incorporating transceivers at both antennas adapted for concurrent transmission and reception.

Figure 4A:
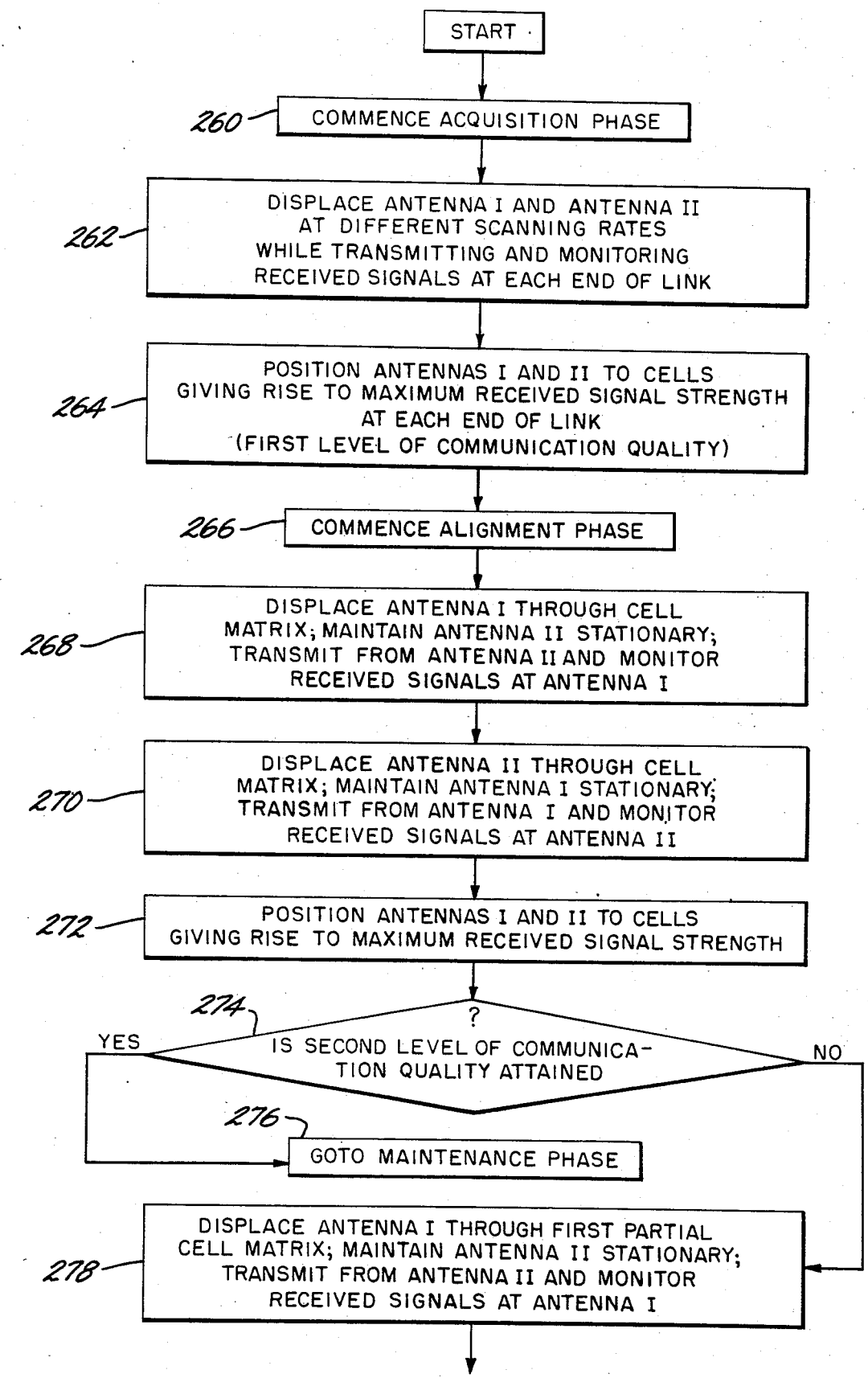
FIGS. 4(a), 4(b) and 4(c) illustrate a flow chart of the steps of the acquisition and alignment phases of practice in accordance with the invention.
Figure 4B:
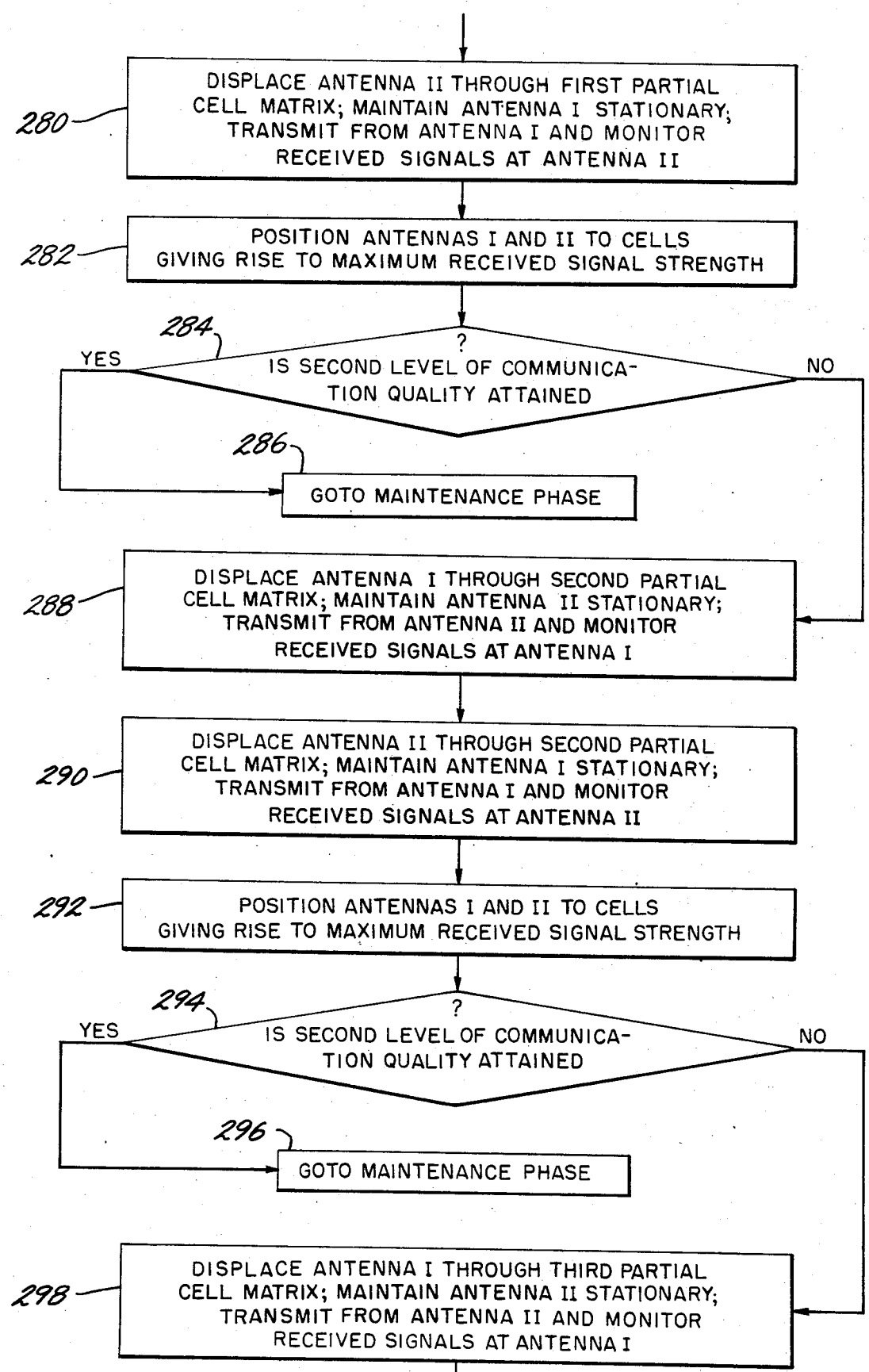
Figure 4C:
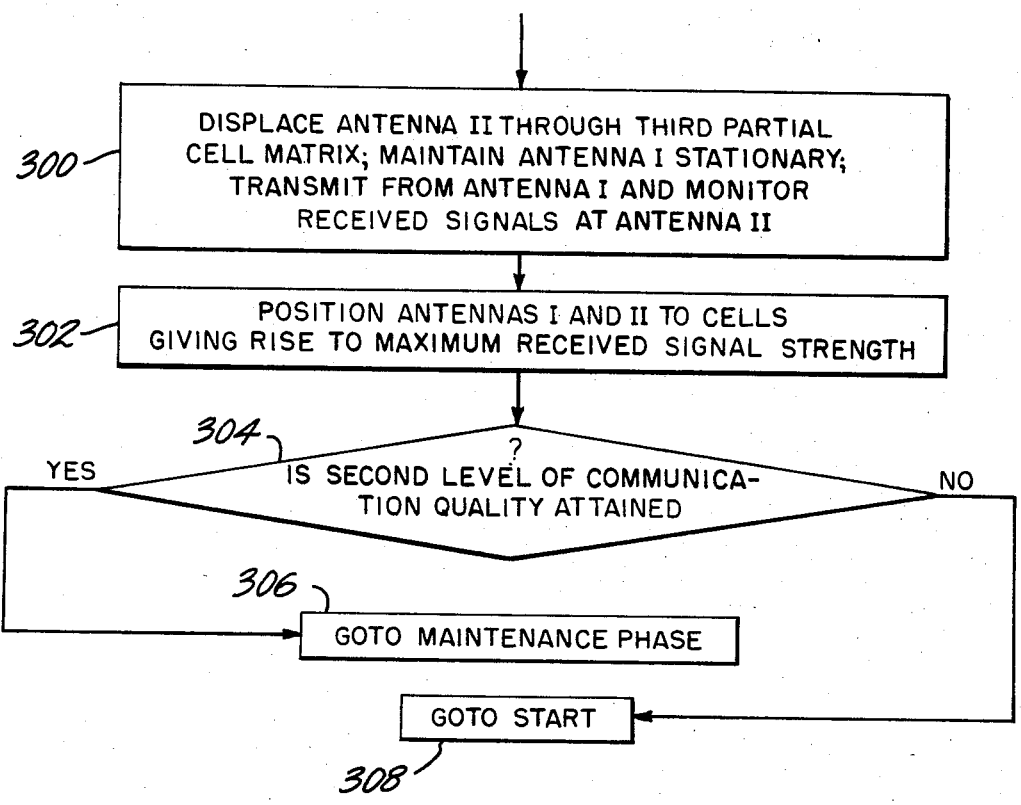

Turning now to FIGS. 4(a), 4(b) and 4(c), the flow chart of the primary program implemented in controller 230 is shown. -START- is preliminary to operations through controller 230 and encompasses mast erection, cable connection and power up. -START- is followed by step 260 -COMMENCE ACQUISITION PHASE-. This phase encompasses step 262 -DISPLACE AN- TENNA I AND ANTENNA II AT DIFFERENT SCANNING RATES WHILE TRANSMITTING AND MONITORING RECEIVED SIGNALS AT EACH END OF THE LINK- and step 264 -POSITION ANTENNAS I AND II TO CELLS GIVING RISE TO MAXIMUM RECEIVED SIGNAL QUALITY). In step 262, a cell by cell search is conducted over a preselected range of uncertainty in azimuth and elevation, where a cell represents approximately one-half of the beamwidth of the antennas and where the range of uncertainty may far exceed the bounds of matrix 258. One antenna transmits to the other and searches at a slower rate than the receiving antenna such that the receiving antenna searches over the complete cell pattern for each cell position at the transmitting antenna. Upon completion of the search cycle of the slower antenna, each antenna is positioned at the location at which it received maximum signal strength as in step 264 to establish a first quality level of communication.

Figure 5:
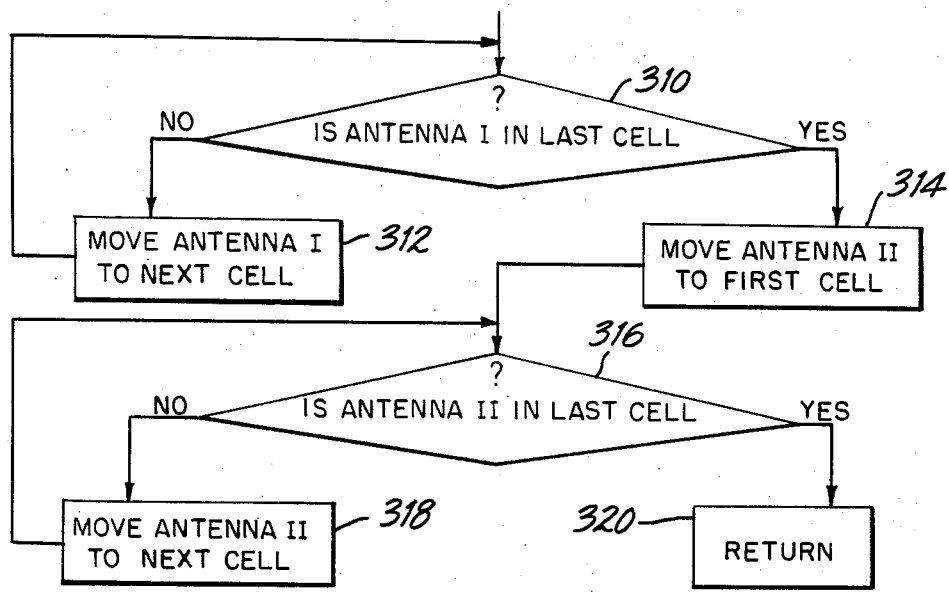
FIG. 5 is a flow chart of steps of the alignment phase in more detail than shown in FIG. 4.

In step 266, the alignment phase is entered and step 268 is practiced -DISPLACE ANTENNA I THROUGH CELL MATRIX; MAINTAIN ANTENNA II STATIONARY; TRNSMIT FROM ANTENNA II AND MONITOR RECEIVED SIGNALS AT ANTENNA I-. In this step, antenna 206 of FIG. 1 is stepped by controller 230 from cell 1 through cell 160 of matrix 258 and antenna 208 furnishes received signal indication to controller 230. In step 270, -DISPLACE ANTENNA II THROUGH CELL MATRIX; MAINTAIN ANTENNA I STATIONARY; TRANSMIT FROM ANTENNA I AND MONITOR RECEIVED SIGNALS AT ANTENNA II-, the practice of step 268 is repeated for antenna 208 of FIG. 1 as the transmitting antenna. A subroutine for the antenna displacement practice of steps 268 and 270 is shown in FIG. 5 and is discussed below. The results of the two searches are implemented in step 272 -POSITION ANTENNAS I AND II TO CELLS GIVING RISE TO MAXIMUM RECEIVED SIGNAL STRENGTH-.

Figure 6:
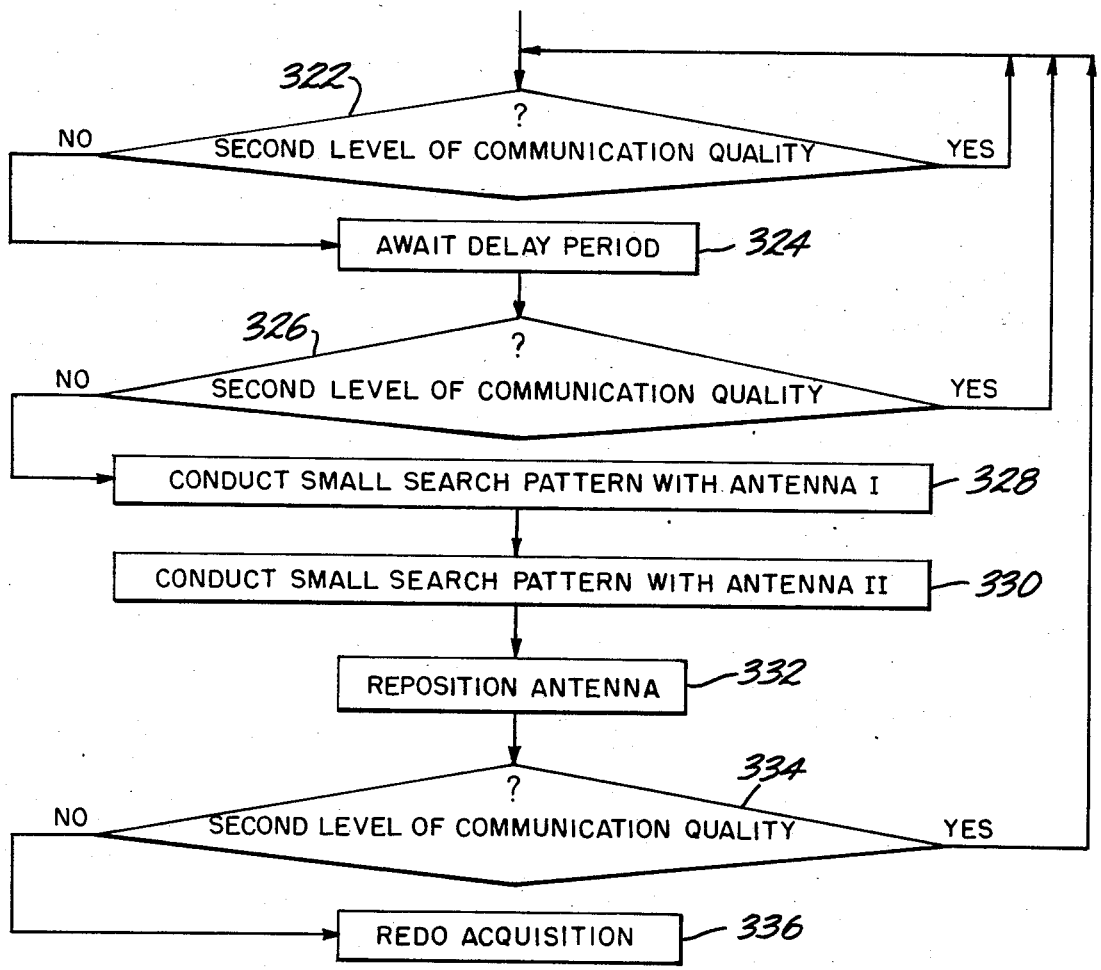
FIG. 6 is a flow chart of steps of the maintenance phase of practice under the invention.

Inquiry is made in step 274 as to communication quality -? IS SECOND LEVEL OF COMMUNICATION QUALITY ATTAINED? If the answer to the inquiry, as determined by controller 230 is yes, step 276 applies, -GOTO MAINTENANCE PHASE-, and practice would proceed to the program of FIG. 6. If no, step 278 is practiced, -DISPLACE ANTENNA I THROUGH FIRST PARTIAL CELL MATRIX; MAINTAIN ANTENNA II STATIONARY; TRANSMIT FROM ANTENNA II AND MONITOR RECEIVED SIGNALS AT ANTENNA I-. The defined search pattern here will flow from the cell positionings of the antennas in step 272. By way of example, the first partial cell matrix may comprise the righthand eight columns and interior eight rows of matrix 258, sixty-four cells. Also practiced at this juncture are step 280 -DISPLACE ANTENNA II THROUGH FIRST PARTIAL CELL MATRIX; MAINTAIN ANTENNA I STATIONARY; TRANSMIT FROM ANTENNA I AND MONITOR RECEIVED SIGNALS AT ANTENNA II- and step 282 -POSITION ANTENNAS I AND II TO CELLS GIVING RISE TO MAXIMUM RECEIVED SIGNAL STRENGTH-.

Inquiry as to communication quality is again made in step 284 -? IS SECOND LEVEL OF COMMUNICATION QUALITY ATTAINED-? If the answer to the inquiry, as determined by controller 230 is yes, step 286 applies, -GOTO MAINTENANCE PHASE-, and practice would proceed to the program of FIG. 6. If no, step 288 is practiced, -DISPLACE ANTENNA I THROUGH SECOND PARTIAL CELL MATRIX; MAINTAIN ANTENNA II STATIONARY; TRANSMIT FROM ANTENNA II AND MONITOR RECEIVED SIGNALS AT ANTENNA I-. The defined search pattern here will flow from the cell positionings of the antennas in step 282. By way of example, the second partial cell matrix may comprise the righthand four columns and interior four rows of matrix 258, sixteen cells. Also practiced at this juncture are step 290 -DISPLACE ANTENNA II THROUGH SECOND PARTIAL CELL MATRIX; MAINTAIN ANTENNA I STATIONARY; TRANSMIT FROM ANTENNA I AND MONITOR RECEIVED SIGNALS AT ANTENNA II- and step 292 -POSITION ANTENNAS I AND II TO CELLS GIVING RISE TO MAXIMUM RECEIVED SIGNAL STRENGTH-.

The iterative diminishing process continues as inquiry is again made in step 294 -? IS SECOND LEVEL OF COMMUNICATION QUALITY ATTAINED-? If the answer to the inquiry is yes, step 296 applies, -GOTO MAINTENANCE PHASE-, and practice would proceed to the program of FIG. 6. If no, step 298 is practiced, -DISPLACE ANTENNA I THROUGH THIRD PARTIAL CELL MATRIX; MAINTAIN ANTENNA II STATIONARY; TRANSMIT FROM ANTENNA II AND MONITOR RECEIVED SIGNALS AT ANTENNA I-. The defined search pattern here will flow from the cell positionings of the antennas in step 292. By way of example, the third partial cell matrix may comprise the righthand two columns and interior two rows of matrix 258, four cells. Also practiced at this juncture are step 300 -DISPLACE ANTENNA II THROUGH THIRD PARTIAL CELL MATRIX; MAINTAIN ANTENNA I STATIONARY; TRANSMIT FROM ANTENNA I AND MONITOR RECEIVED SIGNALS AT ANTENNA II- and step 302 -POSITION ANTENNAS I AND II TO CELLS GIVING RISE TO MAXIMUM RECEIVED SIGNAL STRENGTH-.

In the example at hand, one of the final four cells searched will give rise to positive response to the inquiry in step 304 -? IS SECOND LEVEL OF COMMUNICATION QUALITY ATTAINED-? and step 306 follows -GOTO MAINTAINENCE PHASE-. Otherwise, step 308 applies -GOTO START- and the alignment phase is repeated.

Referring to FIG. 5, the antenna displacement practice subroutine therein includes step 310 - ? IS ANTENNA I IN LAST CELL-?, cell 160 in the example of matrix 258 of FIG. 3. If the inquiry is answered in the negative, step 312 , -MOVE ANTENNA I TO NEXT CELL-, is practiced repetitively with step 310 until the 310 inquiry is answered in the positive. At that stage, step 314 is practiced, -MOVE ANTENNA II TO FIRST CELL. Steps 316, - ? IS ANTENNA II IN LAST CELL-, and 318, -MOVE ANTENNA II TO NEXT CELL-, are repetitively practiced now until the inquiry of step 316 is positively answered, at which time both antennas have been stepped through the entirety of their respective matrices and a RETURN, as in step 320 occurs. The subroutine of FIG. 5 is usable also for the displacement of antennas in the first partial, second partial and third partial matrices byinitializing the subroutine with definition of the respective matrix cells to be employed in succession.

Figure 7:
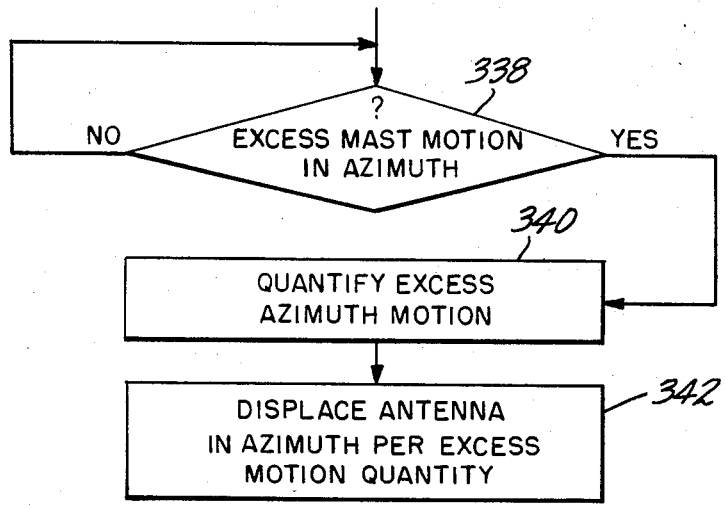
FIGS. 7(a) and 7(b) are flow charts of steps ancillary to the maintenance phase of practice under the invention.

FIG. 6 depicts a flow chart for practice of the maintenance phase, as same is called for by the FIG. 4(a)-(c) program. The program of FIG. 6 includes outset step 322, -? SECOND LEVEL OF COMMUNICATION QUALITY-, and the program simply cycles through this step if the system maintains second level of communication quality. Where the step 322 inquiry is answered in the negative, step 324, -AWAIT DELAY PERIOD-, calls for a several second delay period to acount fo an r-f fade or to permit mast-movement induced correction to antenna disposition per the FIG. 7 routine, if applicable. Inquiry as to quality is then repeated in step 326, -? SECOND LEVEL OF COMMUNICATION QUALITY-. If there was a simple transitory loss of quality, the inquiry is answered now in the affirmative, and recycling through step 322 is reinstated. If the contrary is answered, step 328 is practiced, -CONDUCT SMALL SEARCH PATTERN WITH ANTENNA I-. By "small search pattern" is meant antenna displacement over a quite limited cell group, for example an excursion over immediately adjacent cells to the cell position of the antenna. Step 330 calls out like activity for the other antenna, -CONDUCT SMALL SEARCH PATTERN WITH ANTENNA II-.

Step 332, -REPOSITION ANTENNA-, calls for an adjustment to the positioning of either or both antennas based on the small search. Inquiry as to quality is again made in step 334, -? SECOND LEVEL OF COMMUNICATION QUALITY-, and the answer calls for either a full repetition of the acquisition phase in step 336, -REDO ACQUISITION-, or a return to step 322, the latter occurring where second level communication quality is re-achieved by step 332.

Figure 7B:
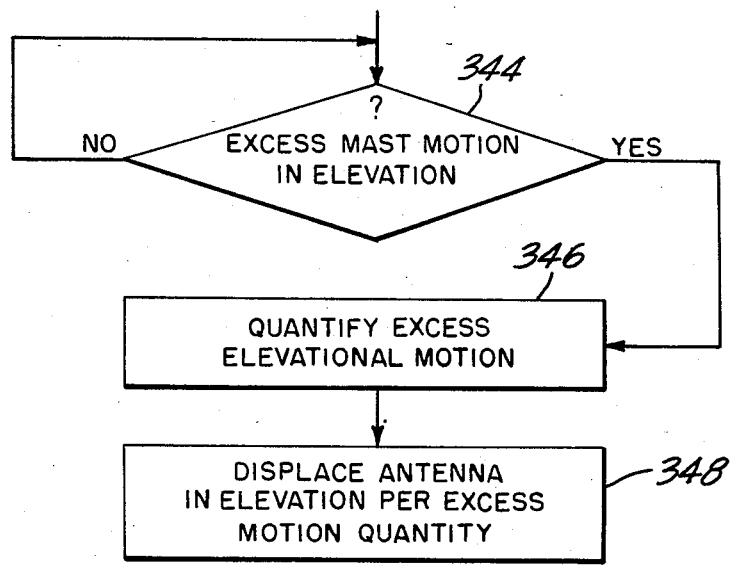

Referring now to FIG. 7(a), the mast motion sensing subsystems constantly look toward antenna mast movement and provide running input to controller 230 of the magnitude of azimuth and elevation movement of the mast. Recognizing that a given lessening of second quality level of communication attributable to nominal mast movement is correctable by controller 230 in its FIG. 6 operation, a threshold is established and mast movement above the threshold, as to which correction by FIG. 6 operation is not possible, gives rise to corrective movement of the antennas by the FIG. 7(a) program. In step 338, - ? EXCESS MAST MOTION IN AZIMUTH-, inquiry is made as to whether mast azimuth motion is above or below the threshold. If the answer is negative, the routine cycles through step 338. If positive, step 340, -QUANTIFY EXCESS AZIMUTH MOTION-, is practiced and advance is made to step 342, -DISPLACE ANTENNA IN AZIMUTH PER EXCESS MOTION QUANTITY. Return is then made to step 338. The counterpart routine for elevation is shown in FIG. 7(b), comprising step 344, -? EXCESS MAST MOTION IN ELEVATION-, step 346, -QUANTIFY EXCESS ELEVATIONAL MOTION-, and step 348, -DISPLACE ANTENNA IN ELEVATION PER EXCESS MOTION QUANTITY.

Figure 8A:
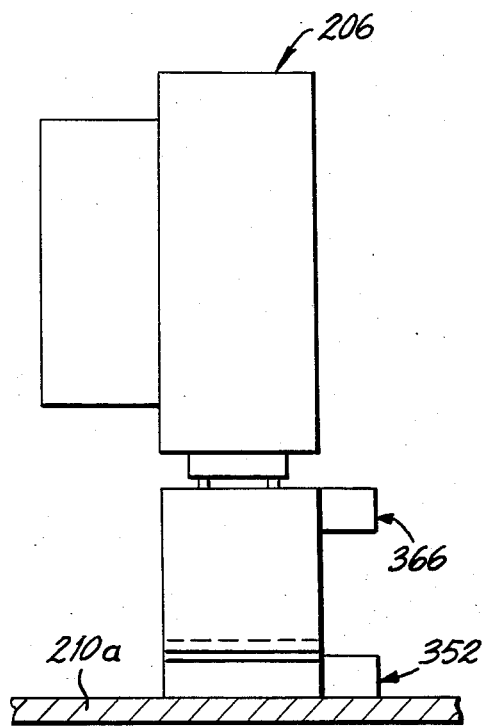
FIGS. 8(a) and 8(b) are respective side and front elevational views of and antenna and displacement units therefor.
Figure 8B:
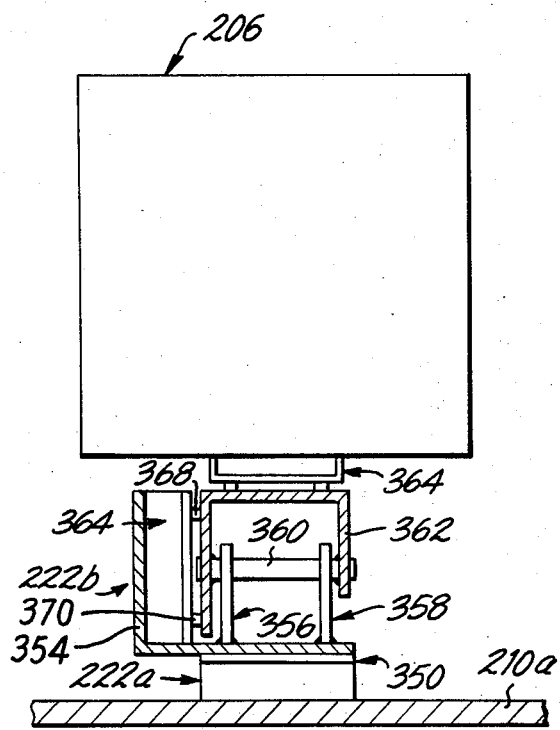

Turning to FIGS. 8(a) and 8(b), an embodiment of antenna displacement units is illustrated. Platform 210a immediately supports azimuth displacement unit 222a of FIG. 1, inclusive of rotary table 350 and drive motor 352. Secured to table 350 for movement therewith is L-shaped plate 354, having antenna support arms 356 and 358 extending upwardly therefrom and supporting elevational movement shaft 360. Shaft 360 has fixedly secured thereto frame 362 and the frame has fixedly secured thereto antenna mounting bracket 364, in turn supporting antenna 206. Plate 354 houses elevation displacement unit 222b of FIG. 1, inclusive of rotary table 364 and drive motor 366. Table 364 output pins 368 and 370 engage frame 362 for imparting rotation thereto about shaft 360.

While the foregoing discussion of practice of the invention was based on the assumption of equipment capability for concurrent transmission and reception at each of the two participating stations, i. e., full duplex equipment, the invention can also be practiced with half duplex equipment of type wherein the "you talk, I listen; then I talk, you listen" discipline applies. Assuming half duplex equipment, the invention is practiced by pre-assignment of performance time slots to crews, respectively to successive transmission and reception for one antenna and respective reception and transmission for the other antenna.

Alternate or concurrent transmission and reception by each station radio may be coordinated over the radio link by passing suitable control signals and interpreting their meanings at either end. For example, the end of the acquisition phase can be definitely established when each radio acknowledges its receipt of the other radio's control signal. Similarly, alternate scanning during the alignment phase can be synchronized by sending end of scan messages.

Various changes to practice and modifications of system may be introduced in and to the foregoing without departing from the invention. Accordingly, it is to be appreciated that the particularly disclosed and depicted preferred embodiments are intended in an illustrative and not in a limiting sense. The true spirit and scope of the invention is set forth in the following claims.

We claim:

1. In a method for effecting communication between first and second antennas, the steps of:
   (a) mutually displacing said first and second antennas, determining received signal strength at each antenna from transmissions by the other thereof and positioning said antennas accordingly to obtain a first quality level of communication therebetween; and
   (b) effecting a second quality level of communication as between said first and second antennas, said second quality level exceeding said first quality level, by defining a plurality of succeedingly diminishing search movement patterns for each of said first and second antennas, transmitting individually from said first and second antennas while displacing the receiving antenna thereof in such patterns and detecting the level of receipt of such transmitted energy by the receiving antenna thereof,
   wherein said step (a) is practiced by equipping said first and second antennas with concurrently operative transmit and receive capability and simultaneously transmitting from and receiving at each said antenna while displacing same at respectively different rates.

2. The invention claimed in claim 1 wherein said step (a) is practiced by equipping said first and second antennas with alternately operative transmit and receive capability and, during one time period, transmitting from said first antenna while receiving at said second antenna and, during a second time period, transmitting from said second antenna and receiving at said first antenna.

3. The invention claimed in claim 1 wherein said search movement patterns are selected to comprise successions of cells in a column-row matrix, said columns being successive in azimuth and said rows being successive in elevation.

4. The invention claimed in claim 3 wherein a first search movement pattern for said first antenna comprises a matrix of n columns and p rows.

5. The invention claimed in claim 4 wherein a second succeeding search movement pattern for said first antenna comprises a matrix of n/2 columns and q rows, q being less than p.

6. The invention claimed in claim 5 wherein a third succeeding search movement pattern for said first antenna comprises a matrix of n/4 columns and q/2 rows.

7. The invention claimed in claim 4 wherein a first search movement pattern for said second antenna comprises a matrix of n columns and p rows.

8. The invention claimed in claim 7 wherein said step (b) is practiced in part by directing each of said first and second antennas to respective cells of said matrices.

9. The invention claimed in claim 8 including the further step of maintaining said second quality level of communication by sensing communication quality lessening from said second quality level of communication and thereupon defining a preselected limited search movement patterns of matrix cells for each of said first and second antennas, transmitting individually from said first and second antennas and detecting receipt of such transmitted energy by the the antenna to which such transmissions are directed, and then directing one or both of said first and second antennas to a respective cell or cells of said matrices.

10. In a method for effecting communication between first and second antennas located at respective differently located stations, the steps of:
   (a) mutually displacing said first and second antennas, determining received signal strength at each antenna from transmissions of the other thereof and positioning said antennas accordingly to obtain a first quality level of communication therebetween;
   (b) obtaining a second quality level of communication as between said first and second antennas, said second quality level exceeding said first quality level, by (1) defining a first search movement pattern, transmitting from said first antenna while moving said second antenna in said first search movement pattern and detecting receipt of such transmitted energy by said second antenna; and (2) defining a second search movement pattern, transmitting from said second antenna while moving said first antenna in said second search movement pattern and detecting receipt of such transmitted energy by said first antenna; and
   (c) coordinating said transmission and receptions in either or both of said steps (a) and (b) by exchanging control signals between said stations.

11. The invention claimed in claim 10 wherein said step (b) (2) is practiced by use of such second pattern in equal configuration to said first pattern.

12. The invention claimed in claim 10 including the further step of defining a third search movement pattern of lesser scope than said first search movement pattern, transmitting from said first antenna while moving said second antenna in said third search movement pattern and detecting receipt of such transmitted energy by said second antenna.

13. The invention claimed in claim 12 including the further step of defining a fourth search movement pattern of lesser scope than said second search movement pattern, transmitting from said second antenna while moving said first antenna in said fourth search movement pattern and detecting receipt of such transmitted energy by said first antenna.

14. The invention claimed in claim 13 including the further step of defining a fifth search movement pattern of lesser scope than said third search movement pattern, transmitting from said first antenna while moving said second antenna in said fifth search movement pattern and detecting receipt of such transmitted energy by said second antenna.

15. A system for effecting communication between first and second antennas, comprising:
   (a) first means for individually displacing said first and second antennas; and
   (b) second means for obtaining a preselected quality level of communication as between said first and second antennas, including (1) means for defining succeedingly diminished search movement patterns for each of said first and second antennas and providing such patterns to said first means for corresponding displacement of said first and second antennas, (2) means for effecting transmissions individually from said first and second antennas and (3) means for detecting the level of receipt of such transmitted energy by the receiving antenna, wherein said means (b)(1) provides said search movement patterns comprising successions of cells in a column-row matrix, said columns being successive in azimuth and said rows being successive in elevation.

16. The invention claimed in claim 15 including means (b)(4) for directing said first means to displace each of said first and second antennas to respective cells of said matrices.

17. The invention claimed in claim 15 wherein said first antenna is supported upon a mast, said system further including means for sensing movement of said mast and providing signals to said first means for displacement of said first antenna.

18. The invention claimed in claim 17 wherein such means for sensing mast movement and providing signals to said first means provides such signals only upon mast movement exceeding a threshold level movement.

19. In a method for effecting communication between first and second antennas, the steps of:
   (a) arranging first and second antennas for movement relative to one another; and
   (b) effecting a predetermined quality level of communication exceeding an initial level of communication as between said first and second antennas by (1) defining a first search movement pattern, transmitting from said first antenna while moving said second antenna in said first search movement pattern and detecting receipt of such transmitted energy by said second antenna; (2) defining a second search movement pattern, transmitting from said second antenna while moving said first antenna in said second search movement pattern and detecting receipt of such transmitted energy by said first antenna; and (3) displacing either or both of said first and second antennas responsively to such detected receipt of such transmitted energy, wherein said step (a) is practiced by supporting at least said first antenna upon a mast and including the further step of sensing movement of said mast and displacing said first antenna responsively to such sensed mast movement.

20. The invention claimed in claim 19 wherein said step (b) (2) is practiced by use of such second pattern in equal configuration to said first pattern.

21. The invention claimed in claim 19 including the further step of defining at least third and fourth search movement patterns respectively of lesser scope than said first and second search movement patterns, transmitting from said first antenna while moving said second antenna in said third search movement pattern and detecting receipt of such transmitted energy by said second antenna and transmitting from said second antenna while moving said first antenna in said fourth search movement pattern and detecting receipt of such transmitted energy by said first antenna and further displacing either or both of said first and second antennas responsively to such detected receipt of energy transmitted in said third and fourth search movement patterns.

* * * * *